(12) United States Patent
Horii et al.

(10) Patent No.: US 9,043,119 B2
(45) Date of Patent: May 26, 2015

(54) IDLE STOP CONTROL DEVICE

(75) Inventors: Hiroaki Horii, Saitama (JP); Shinji Hironaka, Saitama (JP); Yoshitake Sakai, Saitama (JP); Yuki Shiga, Saitama (JP); Kyoji Hamamoto, Saitama (JP); Fumihiro Morishita, Saitama (JP); Hiroki Sagami, Saitama (JP); Takuji Wada, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 342 days.

(21) Appl. No.: 13/498,858

(22) PCT Filed: Sep. 29, 2010

(86) PCT No.: PCT/JP2010/066996
§ 371 (c)(1),
(2), (4) Date: Mar. 28, 2012

(87) PCT Pub. No.: WO2011/040494
PCT Pub. Date: Apr. 7, 2011

(65) Prior Publication Data
US 2012/0185150 A1 Jul. 19, 2012

(30) Foreign Application Priority Data
Sep. 29, 2009 (JP) ................................ 2009-225302

(51) Int. Cl.
*F02D 29/02* (2006.01)
*F02N 11/08* (2006.01)

(52) U.S. Cl.
CPC ............ *F02D 29/02* (2013.01); *F02N 11/0822* (2013.01); *F02N 2200/0801* (2013.01); *F02N 2200/0808* (2013.01); *Y02T 10/48* (2013.01)

(58) Field of Classification Search
CPC ................ F02D 29/02; F02N 11/0822; F02N 2200/0801; F02N 2200/0808; F02N 11/0825; Y02T 10/48
USPC .................. 123/179.3–179.5, 179.14, 339.1, 123/339.14; 701/41, 42, 101, 102, 105, 701/112, 113; 180/65.28, 65.285; 73/114.58, 114.61, 117.02
See application file for complete search history.

(56) References Cited

U.S. PATENT DOCUMENTS 6,390,229 B1 * 5/2002 Kaji .............................. 180/443
6,427,105 B1 * 7/2002 Matsushita ..................... 701/41
(Continued)

FOREIGN PATENT DOCUMENTS

DE  10 2005 055 450 A1  5/2006
EP           1072498 A2 *  1/2001  ............... B62D 5/04
(Continued)

OTHER PUBLICATIONS 140519 machine translation JP 2003-291836 Motoyama.pdf.*
(Continued)

*Primary Examiner* — Erick Solis
*Assistant Examiner* — Carl Staubach
(74) *Attorney, Agent, or Firm* — Carrier Blackman & Associates, P.C.; William D. Blackman; Joseph P. Carrier

(57) ABSTRACT

Disclosed is an idle stop control device capable of relieving reaction force (kickback) of a handle occurring at idle stop controlled by the control of the idle stop control device. Specifically, an EPSECU (20) detects the rotational speed of an electric motor by detecting the rotational angle ($\theta_m$) of the electric motor using a resolver (22), and at the same time, detects the steering torque using a torque sensor (23). Subsequently, the EPSECU determines whether or not the rotational speed of the electric motor and the steering torque are inside an idle stop transition area (P) by referring to a table (28) stored in a memory (27) in advance. When either or both of the rotational speed of the electric motor and the steering torque are outside the idle stop transition area (P), a signal requesting the prohibition of idle stop transition is output to an idle stop control device (10) via a cable (15). Upon receiving the signal requesting the prohibition of idle stop transition, the idle stop control device (10) prohibits the control of transition to idle stop even when conditions for idle stop are met.

4 Claims, 5 Drawing Sheets

(56) References Cited

U.S. PATENT DOCUMENTS

| | | | |
|---|---|---|---|
| 7,115,068 B2* | 10/2006 | Braun et al. | 477/99 |
| 8,392,066 B2* | 3/2013 | Ehara et al. | 701/41 |
| 8,612,113 B2* | 12/2013 | Gibson et al. | 701/99 |
| 8,708,090 B2* | 4/2014 | Boot | 180/446 |
| 2004/0100220 A1* | 5/2004 | Fu | 318/700 |
| 2006/0166789 A1 | 7/2006 | Katou et al. | |
| 2007/0272187 A1* | 11/2007 | Celisse et al. | 123/179.4 |
| 2009/0071745 A1* | 3/2009 | Itakura et al. | 180/446 |
| 2010/0056326 A1* | 3/2010 | Kahn et al. | 477/3 |
| 2011/0046864 A1* | 2/2011 | Kamiya | 701/102 |
| 2013/0173142 A1* | 7/2013 | Kato | 701/112 |
| 2013/0197759 A1* | 8/2013 | Urabe et al. | 701/41 |
| 2013/0297153 A1* | 11/2013 | Chauvelier | 701/42 |
| 2013/0311072 A1* | 11/2013 | Tochihara et al. | 701/112 |

FOREIGN PATENT DOCUMENTS

| | | |
|---|---|---|
| JP | 2002-240528 A | 8/2002 |
| JP | 2003-291836 A | 10/2003 |
| JP | 2006-144718 A | 6/2006 |
| JP | 2008-510926 A | 4/2008 |
| JP | 2008-183990 A | 8/2008 |
| WO | WO 2006/027512 A1 | 3/2006 |

OTHER PUBLICATIONS

Notice of Reason for Rejection, JP Application No. 2011-534286 mail date Jul. 23, 2013.
European Examiner's Opinion, Application No. 10 820 609.5 dated Nov. 28, 2013, 4 pages.
Supplementary European Search Report, Application No. 10820609.5 dated Nov. 5, 2013, 3 pages.

* cited by examiner

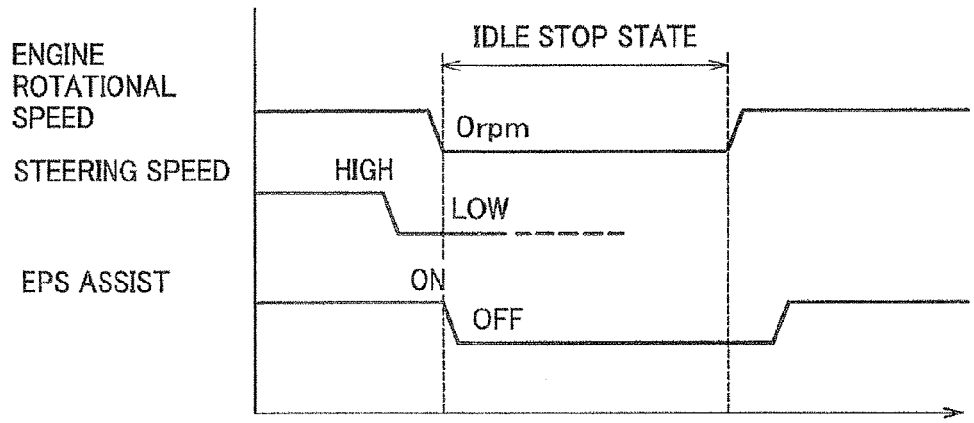
Background Art
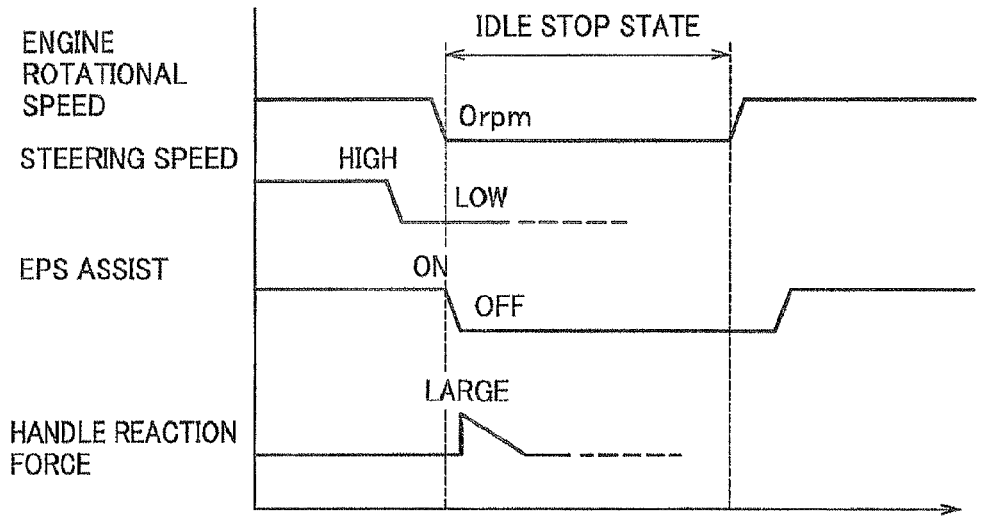
Background Art

IDLE STOP CONTROL DEVICE

TECHNICAL FIELD

The present invention relates to an idle stop control device, and more particularly to an idle stop control device for a vehicle without a power source backup of an electric power steering device.

BACKGROUND ART

In recent years, a technique for improving fuel efficiency by automatically stopping an engine at the time of stopping a vehicle (i.e., an idle stop control) is well known.

For example, in the case of a delivery truck, a driver stops a vehicle during delivery of cargos, gets off a driver seat, accesses a carrier so as to take out a cargo to be delivered. The driver performs the above actions frequently. For this reason, a technique for linking an idle stop control with an air suspension vehicle height adjustment is disclosed (e.g., see Patent Literature 1).

Also, in order to command the engine to stop by the idle stop control, the vehicle should be at a requesting stop step of the engine, and should not under a predetermined operation condition which prevents the engine from being stopped. As an example of the predetermined operation condition which prevents the engine from being stopped, a parking operation can be cited. A technique which uses the parking operation as the predetermined operation condition so that a stop command is not issued to the engine by the idle stop control is disclosed (e.g., see Patent Literature 2).

By the way, in a vehicle which has an idle stop control device using a self-starter and does not have a power source backup of an electric power steering device (hereinafter, referred to as an "EPS"), a large current flowing through a motor for the self-starter causes a battery voltage to drop at the time of cranking.

FIG. 6 shows a power source voltage drop at the start time of cranking. When the cranking is started, a power source voltage $V_{EPS}$ of an unit terminal of the EPS changes as shown by a bold solid line in FIG. 6. Also, as shown by a broken line in FIG. 6, the voltage further drops if the battery deteriorates.

A normal EPS becomes difficult to perform an assist compensation at a voltage equal to or less than about 10V. Also, at a voltage equal to or less than 7V, a CPU reset occurs. Within a area A shown in FIG. 6, the EPS can not perform assist (EPS assist OFF).

For this reason, if the EPS performs the assist, when an engine starting (a cranking) occurs, a steering (hereinafter, referred to as a "handle") is turned back by an instantaneous assist OFF (area A) and a large reaction force (a kickback) is applied to an user.

As described above, if the vehicle does not have the power source backup of the EPS, for example, the EPS assist may be stopped at the time of cranking in order to relieve the reaction force of the handle. That is, if the EPS assist is stopped in advance, the handle reaction force does not occur.

FIG. 7 shows an example of control of an idle stop state and an EPS assist for relieving the handle reaction force. As shown in FIG. 7, if a vehicle is stopped, only when a steering speed caused by a user's operation becomes small, the state transits to an idle stop state and the EPS assist is turned OFF at the same time. After that, when the engine performs complete explosion, the EPS assist is turned back (EPS assist ON).

PRIOR ART DOCUMENTS

Patent Literatures

Patent Literature 1: JP 2002-240528 A
Patent Literature 2: JP 2008-510926 A

SUMMARY OF THE INVENTION

Problems to be Solved by the Invention

However, as shown in FIG. 7, by the method in which the EPS assist is stopped, when the steering speed is "low", the state transits to the idle stop, and the EPS assist is turned OFF regardless of an input torque of the handle caused by the user. As a result, when a handle is stabilized by a user or abuts against an end, a large handle reaction force is applied to the user by stopping the EPS assist.

FIG. 8 shows a handle reaction force when the control shown in FIG. 7 is performed. That is, when a handle is stabilized by a user or abuts against an end, a handle reaction force is generated immediately after the EPS assist is turned OFF.

As described above, by the method in which the EPS assist is stopped at the time of cranking, the handle reaction force caused by cranking can be relieved. On the other hand, the handle reaction force may be generated by the EPS assist OFF (when the handle is stabilized by the user or abuts against the end), and the handle reaction force can not be relieved completely.

The present invention solves the above described problems, and aims to provide an idle stop control device for relieving a handle reaction force (a kickback) at the time of an idle stop.

Means to Solve the Problems

In order to solve the above problems, in accordance with a first feature of the present invention, there is provided an idle stop control device for performing control to transit to an idle stop state at which an operation of an internal-combustion engine is stopped when a predetermined condition is established, the idle stop control device comprising: an information delivery unit for delivering information among power steering devices each of which comprises: an actuator for transmitting a driving force to a steering mechanism in order to assist steering; a steering torque detection unit for detecting a steering torque of the steering mechanism; a rotational speed detection unit for detecting a rotational speed of an output shaft of the steering mechanism; and a control unit for performing an idle stop control by using the information obtained via the information delivery unit, wherein the control unit sets an event that the steering torque and the rotational speed of the output shaft become equal to or less than predetermined values occurs and persists for a predetermined time period, as a condition for transiting to the idle stop state.

According to the first feature of the present invention, when the steering torque and the rotational speed of the output shaft become equal to or less than the predetermined values and persist for the predetermined time period, an idle stop transition prohibition is canceled, and the handle reaction force can be relieved (reduced) even if the EPS assist is turned OFF.

Also, in accordance with a second feature of the present invention, there is provided the idle stop control device wherein the power steering device comprises an electric motor as an actuator for transmitting a driving force to a steering mechanism; and an electric motor current detection unit for detecting current following through the electric motor, and the steering torque detection unit comprises the electric motor current detection unit, and the steering torque is a value detected by the electric motor current detection unit.

According to the second feature of the present invention, the steering torque which is applied to the electric power steering device using the electric motor and is detected by the steering torque detection unit is a value detected by the electric motor current detection unit.

Also, in accordance with a third feature of the present invention, there is provided the idle stop control device wherein the power steering device comprises an electric motor for transmitting a driving force to the steering mechanism in order to assist steering; and an electric motor rotational speed detection unit for detecting a rotational speed of the electric motor, and the rotational speed detection unit comprises the electric motor rotational speed detection unit, and a rotational speed of the output shaft is a value detected by the electric motor rotational speed detection unit.

According to the third feature of the present invention, the rotational speed of the output shaft of the steering mechanism which is applied to the electric power steering device using the electric motor and is detected by the rotational speed detection unit is the value detected by the electric motor rotational speed detection unit.

Also, in accordance with a fourth feature of the present invention, there is provided the idle stop control device wherein the power steering device comprises a steering speed detection unit for detecting a steering speed of a steering wheel of the steering mechanism, and the rotational speed detection unit comprises the steering speed detection unit, and the rotational speed of the output shaft is a value detected by the steering speed detection unit.

According to the fourth feature of the present invention, the rotational speed of the output shaft of the steering mechanism detected by the rotational speed detection unit is the value detected by the steering speed detection unit.

Effect of the Invention

The present invention can provide an idle stop control device for relieving a handle reaction force (a kickback) at the time of idle stop.

BRIEF DESCRIPTION OF THE DRAWINGS

FIG. 7 shows an example of control of an idle stop state and an EPS assist for relieving the handle reaction force; and FIG. 8 shows a handle reaction force.

EMBODIMENTS FOR CARRYING OUT THE INVENTION

With reference to FIGS. 1-8, an idle stop control device according to embodiments of the present invention will be explained below.

First, an electric power steering device which relates to the idle stop control device of this embodiment will be explained.

Figure 1:
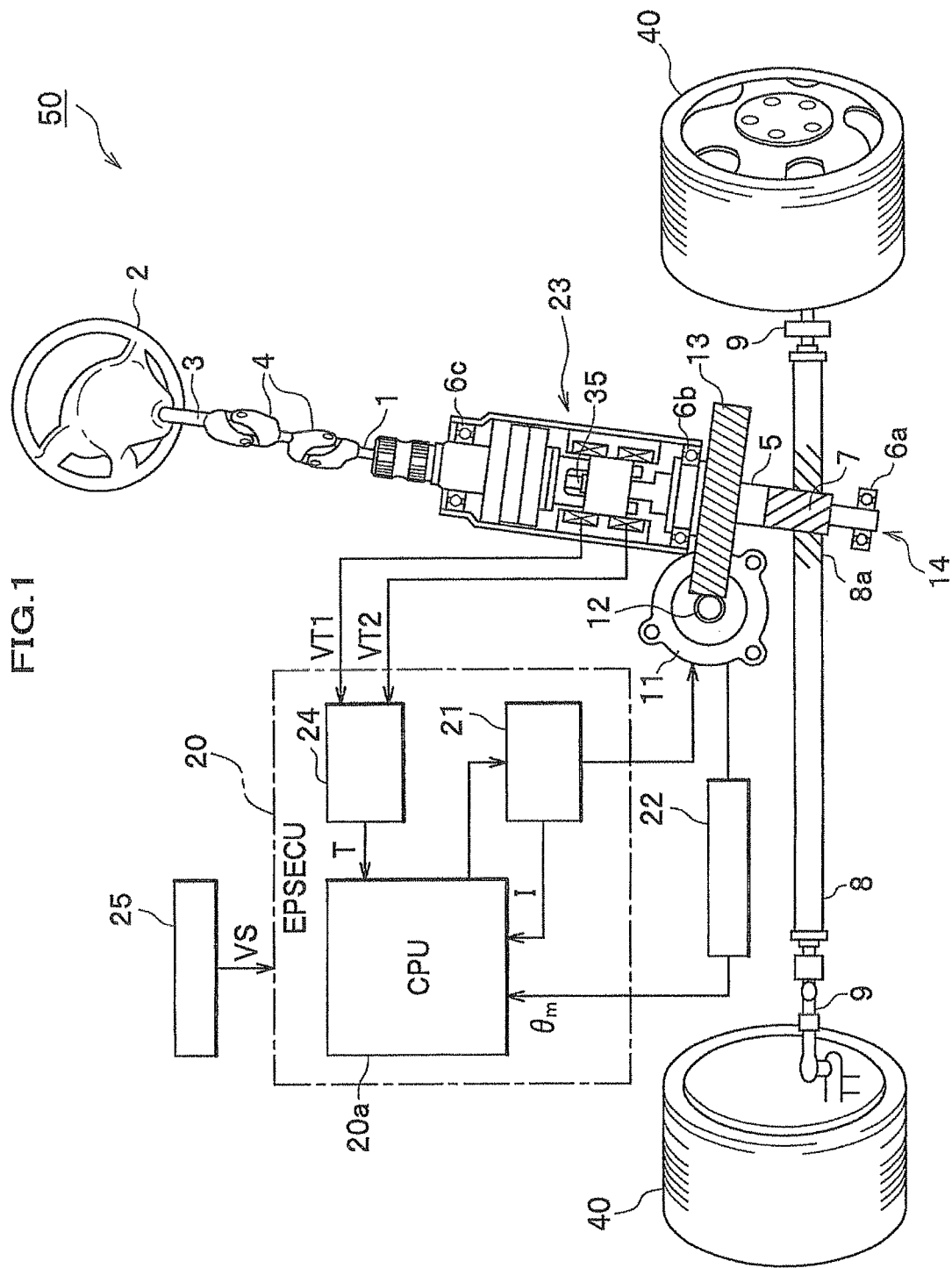
FIG. 1 shows a schematic illustration of an electric power steering device according to an embodiment of the present invention.

FIG. 1 shows a schematic illustration of an electric power steering device 50.

The electric power steering device 50 is made by connecting a main steering shaft 3 having a steering wheel 2, a shaft 1, and a pinion axis 5 via two universal joints 4, 4. Also, a pinion gear 7 provided at a lower end of the pinion axis 5 engages with a rack gear 8a of a rack axis 8 which is reciprocatable in a vehicle width direction, and right and left wheels 40, 40 are connected to both ends of the rack axis 8 via tie rods 9, 9.

According to this structure, the electric power steering device 50 can change a travel direction of the vehicle when the steering wheel 2 is steered. Here, the rack axis 8, the rack gear 8a, and the tie rods 9, 9 compose a steering wheel mechanism, and the steering wheel 2, the main steering shaft 3, the shaft 1, and the pinion axis 5 compose a steering mechanism.

Also, the pinion axis 5 corresponds to the output shaft of the steering mechanism described in the feature of the present invention.

In addition, a lower portion, a middle portion, and an upper portion of the pinion axis 5 are supported by a steering gear box 14 via bearings 6a, 6b, and 6c respectively.

Also, the electric power steering device 50 is provided with an electric motor 11 for providing an auxiliary steering force which reduces a steering force caused by the steering wheel 2. A worm gear 12 provided around the output shaft of the electric motor 11 engages with a worm wheel gear 13 provided around the pinion axis 5. That is, the worm gear 12 and the worm wheel gear 13 compose a reduction gear mechanism. Also, a rotator of the electric motor 11, the worm gear 12 connected to the electric motor 11, the worm wheel gear 13, the pinion axis 5, the rack axis 8, the rack gear 8a, and the tie rods 9, 9, etc., compose a steering system.

The electric motor 11 is a three-phase brushless motor comprising a stator (not shown) having a plurality of field coils and a rotator (not shown) which rotates within the stator, and converts an electric energy to a mechanical energy ($P_M = \omega T_M$). In addition, although the three-phase brushless motor is used in this embodiment, a DC brush motor may be used.

Here, $\omega$ is a rotational speed, and $T_M$ is a torque generated by the electric motor 11. Also, a relationship between the generated torque $T_M$ and an actual output torque $T_M'$ is expressed as follows (i: a speed reduction ratio between the worm gear 12 and the worm wheel gear 13):

$$T_M' = T_M - (c_m d\theta_m/dt + J_m d^2\theta_m/dt^2)*i^2 \qquad (1)$$

From this equation, it is found that a relationship between the output torque $T_M'$ and an electric motor rotational angle $\theta_m$ is defined by a moment $J_m$ of inertia of the rotator of the electric motor 11 and a coefficient $C_m$ of viscosity, and is irrelevant to a vehicle characteristic and a vehicle condition.

Here, for example, assume that a steering torque $T_s$ is applied to the steering wheel 2, and a coefficient of an assist amount $A_H$ performed by a torque generated by the electric motor 11 multiplied via the reduction gear mechanism is defined as $k_A(V)$ which is a function of a vehicle velocity V. In this case, since $A_H = k_A(V)*Ts$, a pinion torque Tp, which is a road surface load, is expressed as follows:

$$T_p = T_s + A_H$$
$$= T_s + k_A(V) * T_s$$

Accordingly, a steering torque $T_s$ is expressed as follows:

$$T_s T_p/(1+k_A(V))$$

Accordingly, the steering torque $T_s$ is reduced to the product of the pinion torque $T_p$ (load) and $1/(1+k_A(V))$. For example, if $kA(0)=2$ when the vehicle velocity $V=0$, the steering torque $T_s$ is controlled to be the product of the pinion torque $T_p$ and ⅓, if $k_A(100)=0$ when the vehicle velocity $V=100$ km/h, the steering torque $T_s$ becomes to be equal to the pinion torque $T_p$, and a steering feeling is controlled to be like a manual steering with a stable steering feeling. That is, by controlling the steering torque Ts based on the vehicle velocity V, a light steering feeling is given at the time of slow speed traveling and the stable steering feeling is given at the time of high speed traveling.

Also, the electric power steering device 50 is provided with the electric motor 11, an EPS ECU (Electric Power Steering Electronic Control Unit) 20 for controlling the electric power steering device 50, an electric motor driving circuit 21 for driving the electric motor 11, a resolver 22, a torque sensor (a steering torque detection unit) 23 for detecting a steering torque applied to the pinion axis 5, a differential amplifier 24 for amplifying an output from the torque sensor 23, and a vehicle velocity sensor 25.

For example, the electric motor driving circuit 21 is provided with a plurality of switching elements such as three-phase FET bridge circuits, generates a rectangular wave power using a DUTY (DUTY U, DUTY V, DUTY W) signal output from a CPU 20a of the EPS ECU 20, and drives the electric motor 11. Also, the electric motor driving circuit 21 detects a three-phase electric motor current I (IU, IV, IW) using a shunt resistor (a current sensor) (not shown).

Accordingly, the electric motor driving circuit 21 corresponds to the electric motor current detection unit described in the feature of the present invention.

The resolver 22 detects the electric motor rotational angle θ m of the electric motor 11 by, for example, approximating a sensor for detecting change in a magnetic reluctance to a magnetic rotational body having a plurality of concaves and convexes at even intervals in a circumferential direction.

The torque sensor 23 detects a steering torque applied to the pinion axis 5, comprises a torsion bar 35 (torsion bar type), and outputs torque detection signals VT1, VT2. The differential amplifier 24 amplifies the torque detection signals VT1, VT2 output from the torque sensor 23, and outputs a torque signal (a torque detection signal) T to the CPU 20a.

The vehicle velocity sensor 25 detects the vehicle velocity V of the vehicle as the number of pulses per unit time, and outputs a vehicle velocity signal VS.

The EPS ECU 20 is provided with the CPU 20a for performing microprocessing, and comprises a ROM (not shown), a RAM (not shown), a microcomputer (not shown), and a peripheral circuit (not shown).

Figure 2:
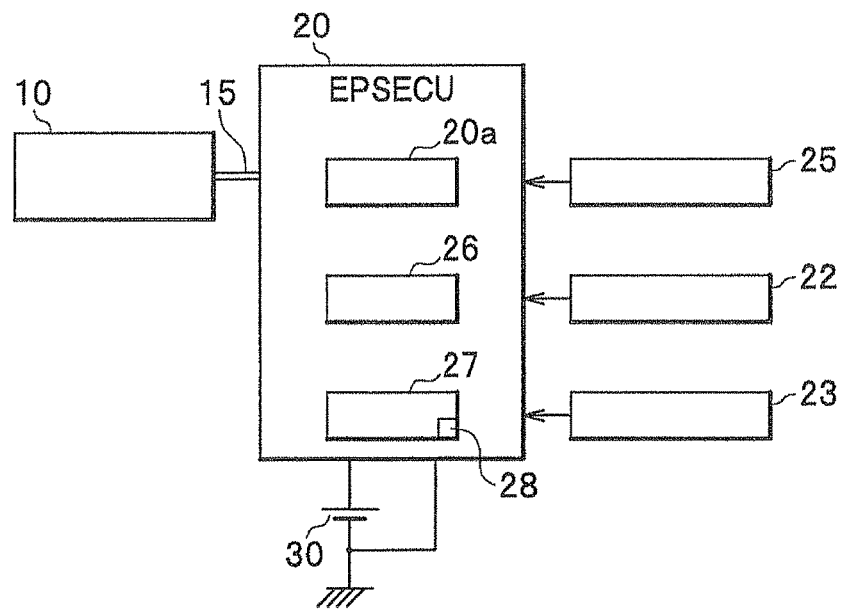
FIG. 2 shows a block diagram of an idle stop control device and an EPS ECU according to the embodiment of the present invention.

FIG. 2 shows a block diagram of an idle stop control device 10 and an EPS ECU 20 according to this embodiment. First, when a vehicle (not shown) is stopped, the idle stop control device 10 automatically stops an engine (an internal-combustion engine) (not shown) in order to improve the fuel efficiency.

The idle stop control device 10 is connected to the EPS ECU 20 via a cable 15 which behaves as an information delivery unit for transmitting information. For example, the cable 15 may be a CAN (controller area network) cable used for a vehicle-mounted network. The EPS ECU 20 comprises a timer 26 for measuring a predetermined time period described later, and a memory 27 for storing a table 28 described later. Further, the EPS ECU 20 is connected to a power source unit 30.

The power source unit 30 is a constant-voltage DC power source, and comprises a rectifier connected to a battery or an alternator, etc. A negative electrode of the power source unit 30 is grounded. A positive electrode of the power source unit 30 is connected via an ignition switch (not shown) linked to an operation of an ignition key (not shown).

The idle stop control device 10 is a well known control unit mounted on a vehicle, and performs control so as to transit to the idle stop when a condition of the idle stop is established. For example, if an accelerator pedal is not fully depressed, the vehicle velocity is 0 km/h (including the case that the vehicle velocity is approximately equal to 0 km/h), and if a brake switch is turned ON, the idle stop control device 10 performs the control so as to transit to the idle stop.

In this embodiment, when the idle stop control device 10 performs the control to transit to the idle stop, an assist by the electric power steering device 50 (hereinafter, referred to as an "EPS assist") is turned OFF in order to avoid the handle reaction force at the time of cranking. At that time, in this embodiment, if the user stabilizes the handle, steers the handle, or makes the handle to abut against an end, the control to turn OFF the EPS assist is prohibited, and the handle reaction force caused by the EPS assist OFF is relieved (reduced).

Figure 3:
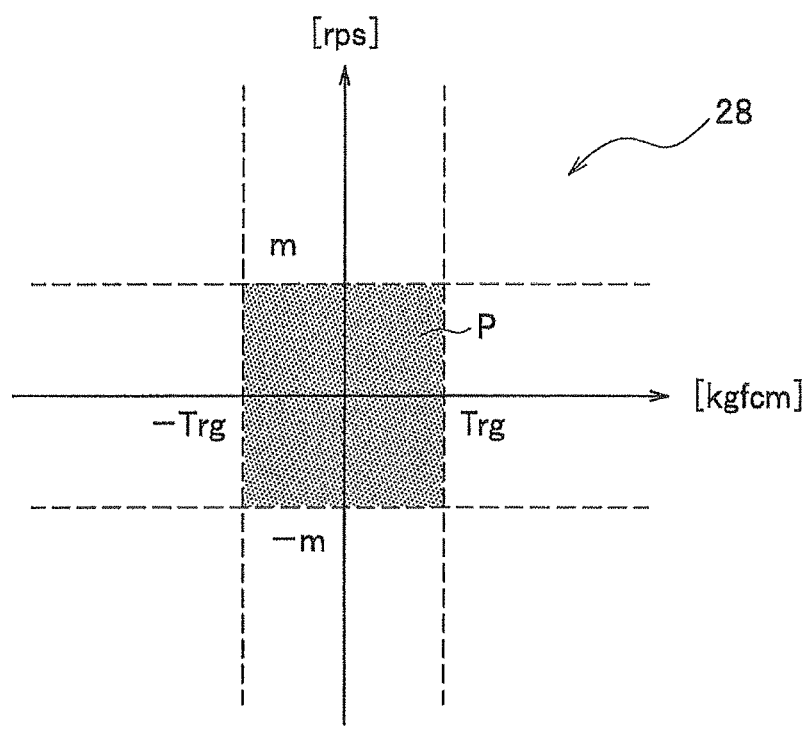
FIG. 3 shows a table used for relieving a handle reaction force stored in a memory.

FIG. 3 shows the table 28 used for relieving the handle reaction force stored in the memory 27. The table 28 shows an area P showing a permissible range (a permissible range of the handle reaction force) of the rotational speed of the electric motor 11 and the steering torque (the detected value of the torque sensor). That is, if the rotational speed of the electric motor indicated by a vertical axis, and the steering torque indicated by a horizontal axis are within the area P stored in the table 28, and if they are within the area P for a continuous time period T0 (ms), the handle reaction force can be relieved. As shown by the area P in FIG. 3, the permissible range of the handle reaction force is within the range of the rotational speed of the electric motor 11 from –m to m [rps] and the steering torque from –Trg to Trg [kgfcm].

Figure 4:
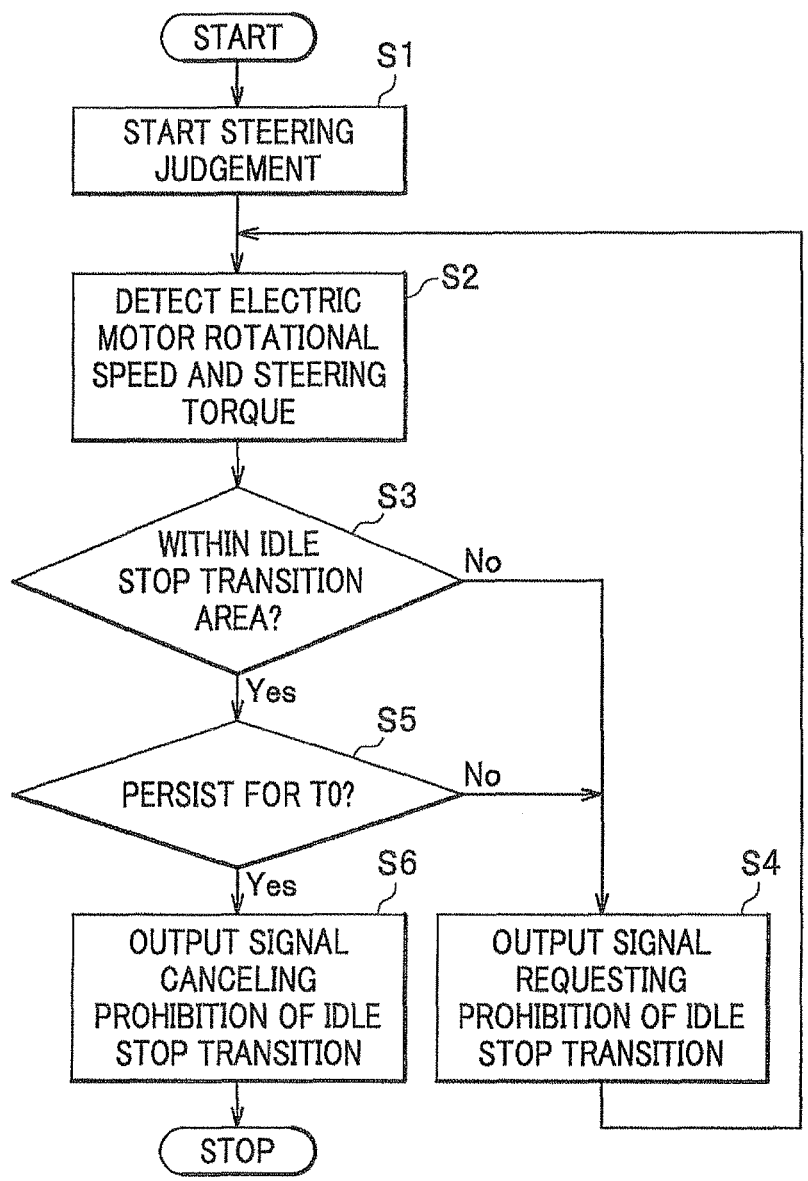
FIG. 4 shows a flowchart for explaining a control action of the EPS ECU of the idle stop control device.

Next, in such a structure, a control action of the EPS ECU 20 of the idle stop control device 10 will be explained with reference to the flowchart shown in FIG. 4.

The EPS ECU 20 starts a steering judgment (S1) when the control of the electric power steering device 50 is started.

First, the EPS ECU 20 detects the electric motor rotational angle θ m using the resolver 22 so as to detect the rotational speed (rps) of the electric motor 11. At the same time, the EPS ECU 20 detects the steering torque (kgfcm) using the torque sensor 23 (S2). Also, the EPS ECU 20 checks whether the rotational speed of the electric motor and the steering torque are within the idle stop transition area P with reference to the table 28 stored in the memory 27 (S3) (see FIG. 3).

In addition, in this embodiment, the rotational speed of the electric motor, which is detected by the EPS ECU 20 and is transmitted to the idle stop control device 10, is information used as a rotational speed of the output shaft (the pinion axis 5) of the steering mechanism. The EPS ECU 20 corresponds to the rotational speed detection unit described in the feature of the present invention.

In step S3, if one or both of the rotational speed of the electric motor and the steering torque are outside of the idle stop transition area P (S3: No), the EPS ECU 20 outputs a signal requesting the prohibition of idle stop transition to the idle stop control device 10 as information via the cable 15 (S4). In addition, the signal requesting the prohibition of idle stop transition persists until a steering judgment result signal is output next to a predetermined time period (step S4 or step S6 described later).

When the idle stop control device 10 receives the signal requesting the prohibition of idle stop transition, the idle stop control device 10 is prohibited from performing control to transit to the idle stop even if the condition is established.

Figure 5:
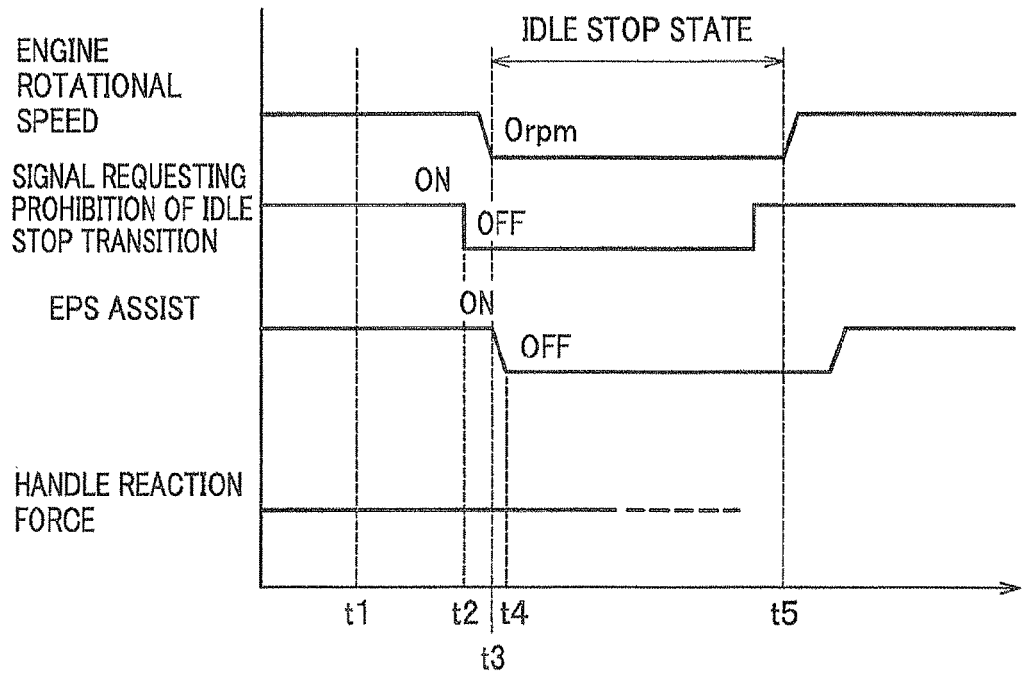
FIG. 5 shows a timing diagram of control according to a signal of a steering judgment.
Figure 6:
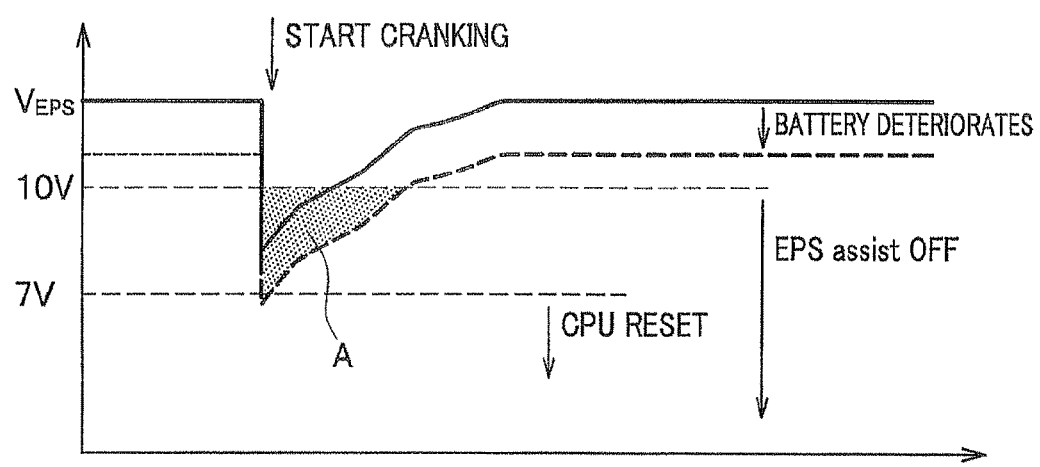
FIG. 6 shows a power source voltage drop at the start time of cranking.

FIG. 5 shows a timing diagram of control according to the signal requesting the prohibition of idle stop transition. In the case of the signal requesting the prohibition of idle stop transition shown in step S4, for example, the engine rotational speed, the EPS assist, and the handle reaction force at the time of t1 in FIG. 5 are shown.

Also, in step S3, if both of the rotational speed of the electric motor and the steering torque are within the idle stop transition area P (S3: Yes), the EPS ECU 20 measures a continuous time using the timer 26, and checks whether both of the rotational speed of the electric motor and the steering torque persist for more than the continuous time period T0 (ms) within the idle stop transition area P (S5).

In step S5, if one or both of the rotational speed of the electric motor and the steering torque do not persist for the continuous time period T0 (ms) within the idle stop transition area P (S5: No), the EPS ECU 20 outputs the signal requesting the prohibition of idle stop transition to the idle stop control device 10 as information via the cable 15 (S4). In addition, as described above, the signal requesting the prohibition of idle stop transition persists until the steering judgment signal is output next to the predetermined time period (step S4 or step S6 described later).

Also, in step S5, if both of the rotational speed of the electric motor and the steering torque persist for more than the continuous time period T0 (ms) within the idle stop transition area P (S5: Yes), the EPS ECU 20 outputs a signal for canceling the idle stop transition prohibition (turn OFF the signal requesting the prohibition of idle stop transition) to the idle stop control device 10 as information via the cable 15 (S6). If the signal requesting the prohibition of idle stop transition, which is explained in step S6, is turned OFF, the state is shown at the time of t2 in FIG. 5.

If the idle stop control device 10 receives the signal for canceling the idle stop transition prohibition in step S6, the idle stop control device 10 performs control so as to transit to the idle stop when the condition of the idle stop is established; that is, when a judgement is made by the EPS ECU 20, based on readouts from all relevant sensors, that a temporary stoppage of the engine is permitted. When the condition of the idle stop is established, the idle stop control device 10 performs control so as to transit to the idle stop. As a result, the engine rotational speed becomes 0 (rpm) at the time t3 in FIG. 5, and the idle stop state is established.

Also, when the state transmits to the idle stop, the EPS ECU 20 turns OFF the control of the electric power steering device 50 (the EPS assist) at the time t4 in FIG. 5. At that time, the handle reaction force is not generated immediately after the EPS assist is turned OFF.

In addition, in this embodiment, both values of the rotational speed of the electric motor and the steering torque are used. The reason is that the time when the handle is stabilized by the user, when the handle is steered by the user, or when the handle abuts against the end can not be judged using only the value of the rotational speed of the electric motor, and that the time when the wheel is cut quickly can not be judged using only the value of the steering torque because the value of the torque crosses zero.

According to this embodiment, by performing the steering judgment so as to control the request for the idle stop transition prohibition to the idle stop control device, even if the EPS assist is turned OFF, the handle reaction force can be relieved (reduced). That is, only if the user surely stops steering, or only if the user stops steering till the assist amount at which the handle reaction force is not generated, the request for the idle stop transition prohibition can be canceled.

In addition, the steering judgment is performed using the rotational speed of the electric motor and the steering torque in this embodiment, steering judgment may be performed using the steering speed (a value accompanied by the rotational speed of the output shaft of the steering mechanism) of the steering wheel and a current of the electric motor (an EPS assist current) instead of the rotational speed of the electric motor and the steering torque. The parameters may be selected depending on availability and precision of sensor mounted on the vehicle.

The method for detecting the steering speed of the steering wheel is not limited. For example, a steering wheel angle sensor (not shown) which comprises a rack position sensor for detecting a movement amount of the rack axis and detects the steering wheel angle may be used, and the EPS ECU 20 (see FIG. 1) may calculate the steering speed by differentiating the steering wheel angle detected by the steering wheel angle sensor. In this structure, the EPS ECU 20 corresponds to the steering speed detection unit.

Also, values of a planet gear and a harmonic drive (registered trademark) used for a steering mechanism transfer ratio variable mechanism (e.g., VGS (Variable Gear ratio Steering) may be values accompanied by the rotational speed of the output shaft of the steering mechanism.

Also, the value accompanied by the rotational speed of the output shaft of the steering mechanism may be obtained by directory detecting the rotational speed of the output shaft.

In addition, the transition to the idle stop state can be done from not only the time of parking but also from the time of slow speed.

Also, when the state returns from the idle stop state, other table than that used for the idle stop transition prohibition is used.

EXPLANATION OF REFERENCES

2 steering wheel
5 pinion axis (steering mechanism output shaft)
10 idle stop control device (control unit)
11 electric motor (actuator)
15 cable (information delivery unit)
20 EPS ECU (rotational speed detection unit, steering speed detection unit)
21 electric motor driving circuit (electric motor current detection unit)
22 resolver (electric motor rotational speed detection unit)
23 torque sensor (steering torque detection unit)
24 differential amplifier
25 vehicle velocity sensor
30 power source unit
50 electric power steering device (EPS)

The invention claimed is:
1. An idle stop control device for performing control to transit to an idle stop state at which an operation of an internal-combustion engine is stopped when a predetermined condition is established, the idle stop control device comprising:
   an information delivery unit for delivering information between components of an electric power steering system which comprises:
      an electric motor as an actuator for transmitting a driving force to a steering mechanism in order to assist steering;
      a steering torque detection unit for detecting a steering torque of the steering mechanism;
      a shaft rotational speed detection unit for detecting a rotational speed of an output shaft of the steering mechanism; and
      an electric motor rotational speed detection unit for detecting a rotational speed of the electric motor, wherein the shaft rotational speed detection unit comprises the electric motor rotational speed detection unit, and the rotational speed of the output shaft is a value detected by the electric motor rotational speed detection unit; and a control unit for performing an idle stop control by using the information obtained via the information delivery unit, wherein:

the control unit is configured to recognize a predetermined range of the steering torque and the rotational speed of the output shaft within which a handle reaction force of the power steering device will be relieved, said predetermined range being at least partially defined by a predetermined steering torque value and a predetermined rotational speed of the output shaft value, the control unit judges to be none of a state that a steering wheel is stabilized by a user, a state that a steering wheel is steered by a user, and a state that a steering wheel abuts against an end by a user, when the steering torque and the rotational speed of the output shaft become and remain equal to or less than the predetermined values for steering torque and rotational speed of the output shaft for a predetermined time period, thereby making a stopping permitted judgment, and the control unit transits to the idle stop state in response to the stopping permitted judgment which is part of the condition for transiting to the idle stop state, and upon transiting to the idle stop state, the control unit turns off the power steering device.

2. The idle stop control device according to claim 1, wherein the power steering system further comprises an electric motor current detection unit for detecting current flowing through the electric motor, and the steering torque detection unit comprises the electric motor current detection unit, and the steering torque is a value detected by the electric motor current detection unit.

3. A method of controlling operation of an electric power steering assist system in a vehicle, said method comprising the steps of:

a) determining whether a defined condition has been met, wherein said defined condition comprises continuously maintaining a rotary speed of an electric power steering assist motor and a torque applied to a steering shaft within specified ranges for a predetermined time;

b) determining whether or not an idle stop condition precedent is present;

c) when the idle stop condition precedent is present and said defined condition is met, temporarily stopping an engine of said vehicle and then turning off an electric power steering assist using an electronic control unit.

4. A method of controlling operation of an electric power steering assist system in a vehicle, said method comprising the steps of:

a) detecting a rotary speed of an electric power steering assist motor, using a rotary speed sensor, as a first sensed steering condition;

b) detecting a torque applied to a steering shaft, using a steering torque sensor, as a second sensed steering condition;

c) monitoring values of said sensed steering conditions during a predetermined time period, and comparing the sensed values of said sensed steering conditions to values stored in a computer memory to determine whether or not said sensed values are within specified ranges defining an idle stop transition zone;

d) if at least one of the sensed values of said the sensed steering conditions is outside of the idle stop transition zone at any time during said first time period, outputting an idle stop prohibition signal to an electronic control unit prohibiting an idle stop;

repeating steps c through d as needed;

e) when the sensed steering conditions remain within the idle stop transition zone continuously for the predetermined time period, generating a cancellation signal to cancel any existing prohibition of the idle stop transition;

f) determining whether or not an idle stop condition precedent is present;

g) when the idle stop condition precedent is present, checking for said idle stop prohibition signal;

h) when the idle stop condition precedent is present, and no idle stop prohibition signal is detected, temporarily stopping an engine of the vehicle and then turning off an electric power steering assist using said electronic control unit.

\* \* \* \* \*